US008726271B1

(12) United States Patent
Weathersby

(10) Patent No.: US 8,726,271 B1
(45) Date of Patent: *May 13, 2014

(54) METHOD AND SYSTEM FOR INSTALLING SOFTWARE

(75) Inventor: Richard Douglas Weathersby, New Braunfels, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1843 days.

This patent is subject to a terminal disclaimer.

(21) Appl. No.: 11/322,491

(22) Filed: Dec. 30, 2005

(51) Int. Cl.
*G06F 9/45* (2006.01)

(52) U.S. Cl.
USPC .......................................................... 717/177

(58) Field of Classification Search
USPC .......................................................... 717/177
See application file for complete search history.

(56) References Cited

U.S. PATENT DOCUMENTS

| 5,583,983 | A | 12/1996 | Schmitter |
| 5,768,568 | A | 6/1998 | Inui et al. |
| 5,797,015 | A | 8/1998 | Daniels, Jr. et al. |
| 5,860,012 | A | 1/1999 | Luu |
| 5,870,611 | A | 2/1999 | Shrader et al. |
| 6,093,215 | A | 7/2000 | Buxton et al. |
| 6,138,153 | A | 10/2000 | Collins et al. |
| 6,151,643 | A | 11/2000 | Cheng et al. |
| 6,192,518 | B1 | 2/2001 | Neal |
| 6,195,794 | B1 | 2/2001 | Buxton |
| 6,490,722 | B1 | 12/2002 | Barton et al. |
| 6,499,137 | B1 | 12/2002 | Hunt |
| 6,725,453 | B1 * | 4/2004 | Lucas et al. .................. 717/178 |
| 6,865,737 | B1 | 3/2005 | Lucas et al. |
| 6,954,925 | B1 | 10/2005 | Kong |
| 6,968,551 | B2 | 11/2005 | Hediger et al. |
| 6,973,647 | B2 | 12/2005 | Crudele et al. |
| 7,093,259 | B2 | 8/2006 | Pulsipher et al. |
| 7,150,014 | B2 | 12/2006 | Graupner et al. |
| 7,577,951 | B2 | 8/2009 | Partamian et al. |
| 7,617,414 | B2 | 11/2009 | Becker et al. |
| 7,680,910 | B2 | 3/2010 | Wallis et al. |
| 7,770,167 | B1 | 8/2010 | Weathersby |
| 7,792,799 | B2 | 9/2010 | Craswell et al. |
| 7,793,087 | B2 | 9/2010 | Zenz et al. |
| 7,802,247 | B1 | 9/2010 | Weathersby |

(Continued)

OTHER PUBLICATIONS

"WinINSTALL Software Distribution Suite (SDS)." OnDemand Software, viewed on Jun. 14, 2006 http://www.ondemandsoftware.com/sds.asp.

(Continued)

*Primary Examiner* — John Chavis
(74) *Attorney, Agent, or Firm* — Baker and Hostetler LLP

(57) ABSTRACT

Method and system are disclosed for providing multiple installations of a software application. The method/system creates an installation template from a single correct or "golden" installation of the software application and uses the installation template to produce additional installations of the software application. In one embodiment, any references to a specific host or computing system in the files or directories of the installed software application are replaced with a temporary variable in the installation template. The installation template may then be stored on a designated server and uploaded to any computing system needing a new installation of the software application. Once uploaded, the variable is replaced with system-specific references to complete the new installations. Since the installations are produced from the installation template and not from floppy disks or CD-ROMs, the process takes significantly less time.

21 Claims, 6 Drawing Sheets

(56) References Cited

U.S. PATENT DOCUMENTS

| | | |
|---|---|---|
| 7,831,968 B1 | 11/2010 | Weathersby |
| 7,840,955 B1 | 11/2010 | Weathersby |
| 7,840,961 B1 | 11/2010 | Weathersby |
| 8,261,232 B2 | 9/2012 | Devarakonda et al. |
| 8,266,254 B2 | 9/2012 | Garrison et al. |
| 8,566,820 B1 | 10/2013 | Weathersby |
| 2002/0016955 A1 | 2/2002 | Matsuo |
| 2002/0104069 A1 | 8/2002 | Gouge et al. |
| 2002/0104080 A1 | 8/2002 | Woodard et al. |
| 2002/0188939 A1 | 12/2002 | Hediger et al. |
| 2003/0182301 A1 | 9/2003 | Patterson et al. |
| 2004/0015957 A1 | 1/2004 | Zara et al. |
| 2004/0015959 A1* | 1/2004 | Kobayashi ............ 717/174 |
| 2004/0044643 A1* | 3/2004 | deVries et al. ............ 707/1 |
| 2004/0060045 A1 | 3/2004 | Hind et al. |
| 2004/0148601 A1 | 7/2004 | Kroening |
| 2004/0204949 A1 | 10/2004 | Shaji et al. |
| 2004/0268298 A1 | 12/2004 | Miller et al. |
| 2005/0055667 A1 | 3/2005 | Beringer et al. |
| 2005/0120331 A1 | 6/2005 | Asare et al. |
| 2005/0120344 A1 | 6/2005 | Asare et al. |
| 2005/0120347 A1 | 6/2005 | Asare et al. |
| 2005/0251786 A1 | 11/2005 | Citron et al. |
| 2005/0262503 A1 | 11/2005 | Kane |
| 2006/0015839 A1 | 1/2006 | Owens et al. |
| 2006/0048129 A1 | 3/2006 | Napier et al. |
| 2006/0195839 A1 | 8/2006 | Lin et al. |
| 2006/0206866 A1 | 9/2006 | Eldrige et al. |
| 2006/0242626 A1* | 10/2006 | Pham et al. ............ 717/121 |
| 2006/0245354 A1 | 11/2006 | Gao et al. |
| 2007/0028229 A1 | 2/2007 | Knatcher |
| 2007/0055972 A1 | 3/2007 | Brown et al. |
| 2007/0157185 A1* | 7/2007 | Semerdzhiev et al. ....... 717/148 |
| 2007/0162892 A1* | 7/2007 | Zenz et al. ............ 717/121 |
| 2007/0214449 A1 | 9/2007 | Choi et al. |
| 2007/0294321 A1 | 12/2007 | Midgley et al. |
| 2008/0059950 A1 | 3/2008 | Seitz et al. |
| 2008/0127169 A1 | 5/2008 | Malasky et al. |
| 2008/0134163 A1 | 6/2008 | Golde |
| 2008/0155216 A1 | 6/2008 | Shoham |
| 2008/0201705 A1 | 8/2008 | Wookey |
| 2008/0256531 A1* | 10/2008 | Gao et al. ............ 717/177 |
| 2008/0288934 A1 | 11/2008 | Ozawa |
| 2009/0171705 A1* | 7/2009 | Bobak et al. ............ 705/7 |
| 2010/0125841 A1 | 5/2010 | Bauer et al. |
| 2010/0179942 A1 | 7/2010 | Wallis et al. |

OTHER PUBLICATIONS

"Installing software through the NAL." Xavier Information Systems & Services, viewed on Jun. 14, 2006 http://www.xu.edu/helpdesk/installing_software.htm.

"Integrating Pendragon Forms Distribution Toolbox with Pendragon SyncServer." Pendragon Software Corporation, viewed on Jun. 14, 2006 http://www.pendragon-software.com/forms3/toolboxesyncserver.html.

Alpem, et al. "PDS: A Virtual Execution Environment for Software Deployment", 2005, ACM, p. 175-185.

Hoek, A. "Configurable Software Architecture in Support of Configuration Management and Software Deployment", 1999, ACM, p. 732-733.

* cited by examiner

METHOD AND SYSTEM FOR INSTALLING SOFTWARE

CROSS-REFERENCE TO RELATED APPLICATIONS

This application is related in subject matter to, and hereby incorporates by reference, the following co-pending U.S. patent application Ser. No. 11/322,403, entitled METHOD AND SYSTEM FOR INSTALLING SOFTWARE, filed Dec. 30, 2005 (Applicant Reference No. US-0077.02); application Ser. No. 11/322,494, entitled METHOD AND SYSTEM FOR INSTALLING SOFTWARE, filed Dec. 30, 2005 (Applicant Reference No. US-0077.03); and application Ser. No. 11/323,207, entitled METHOD AND SYSTEM FOR INSTALLING SOFTWARE, filed Dec. 30, 2005 (Applicant Reference No. US-0077.01).

TECHNICAL FIELD

The disclosed embodiments relate generally to software applications and particularly to a method and system for installing the software applications on multiple computing systems.

BACKGROUND

Advances in software programming and computing technology have made increasingly sophisticated and feature-rich software applications available to consumers and businesses alike. These powerful software applications provide a growing list of benefits in terms of improved accuracy, efficiency, and convenience for numerous tasks performed on a regular basis. Industry indicators predict that this trend is likely to continue and may even accelerate in the years ahead.

However, as software applications become more sophisticated, their installation and maintenance become correspondingly more difficult. E-commerce and online transaction-related software applications are particularly unwieldy in terms of size and complexity. Consequently, most companies retain a highly-trained technical support group or department dedicated to setting up and supporting various software applications used within their organizations. Users who need a software application may simply submit a request through the appropriate channels listing their specific requirements. The technical support department thereafter prepares the needed computing system (i.e., hardware and operating system), installs the requested software application, and presents the completed installation to the users.

An example of the procedure described above is illustrated in FIG. 1 via a system 100. A user 102 of the system 100 begins the procedure by submitting a request for a particular software application through designated channels to an organization's technical support department. Technical support personnel then obtain an appropriate computing system 104a, 104b, or 104c for installation of the requested software application, perform the installation, and test the installed software application to ensure proper operation. The installations are usually performed manually by inserting one or more portable media 106 (e.g., floppy disks or CD-ROMs) into an appropriate disk drive of the selected computing system 104a, 104b, or 104c, usually one disk at a time. After the installation is complete, the technical support personnel either physically deliver the computing system 104a, 104b, or 104c to the user or else make it available over a network connection (not expressly shown).

A drawback of the above procedure is that every request for the software application must be installed from the beginning on each computing system 104a, 104b, and 104c via the portable media 106. Even for highly-trained technical support personnel, such a procedure is often fraught with potential problems and delays. For example, in addition to the lengthy installation time required, hardware and/or software incompatibilities may exist (e.g., a resource conflict between the operating system and the software application). Furthermore, the software application may require one or more patches or fixes, sometimes in a certain sequence or order, that can add to an already long installation time. Moreover, there may sometimes be human errors, such as clicking the wrong button, striking the wrong key, inserting the wrong disk, and so forth, that frequently lengthen the installation time even more. All of these problems are exacerbated when the software application is large, complex, and is required to be installed numerous times on multiple computing systems.

Accordingly, what is needed is a more efficient way to make a software application available on multiple computing systems without having to install the software application from the beginning via floppy disks, CD-ROMs, or other portable media for each computing system.

SUMMARY

The disclosed embodiments are directed to a method and system for providing multiple installations of a software application. The method/system creates an installation template from a single correct or "golden" installation of the software application and uses the installation template to produce additional installations of the software application. In one embodiment, any references to a specific host or computing system in the files or directories of the installed software application are replaced with a temporary variable in the installation template. The installation template may then be stored on a designated server and uploaded to any computing system needing a new installation of the software application. Once uploaded, the variable is replaced with system-specific references to complete the new installation. Since the installations are produced from the installation template and not from floppy disks or CD-ROMs, the process takes significantly less time.

In general, in one aspect, the embodiments are directed to a method of distributing multiple instances of a software application over a network. The method comprises creating an installation template of a software application, the installation template containing configuration directories and configuration files for the software application. The method further comprises using one or more software tools to transfer the installation template to a computing system over a network, retrieve the configuration directories and the configuration files from the installation template, and insert in the configuration directories and the configuration files any computing system-specific references required by the software application with respect to the computing system.

BRIEF DESCRIPTION OF THE DRAWINGS

The foregoing and other advantages of the invention will become apparent from the following detailed description and upon reference to the drawings, wherein.

DETAILED DESCRIPTION

Following is a detailed description of illustrative embodiments with reference to the drawings wherein the same reference labels are used for the same or similar elements. As used throughout this description and the claims, the terms "a" and "an" are intended to mean "one or more."

As mentioned above, existing procedures for installing multiple instances of a software application, particularly a large and complex software application, are inefficient and fraught with potential problems and delays. Various embodiments provide a method and system for more efficiently installing software applications. A correct or "golden" (i.e., error-free) installation of a software application is used to create an installation template. The installation template may then be uploaded to any computing system requiring a copy of the software application. Since the installation template is based on a correctly-installed instance of the software application, all subsequent installations made from the installation template are also correct. And since the subsequent installations are made from the installation template, the process takes significantly less time.

Figure 2:
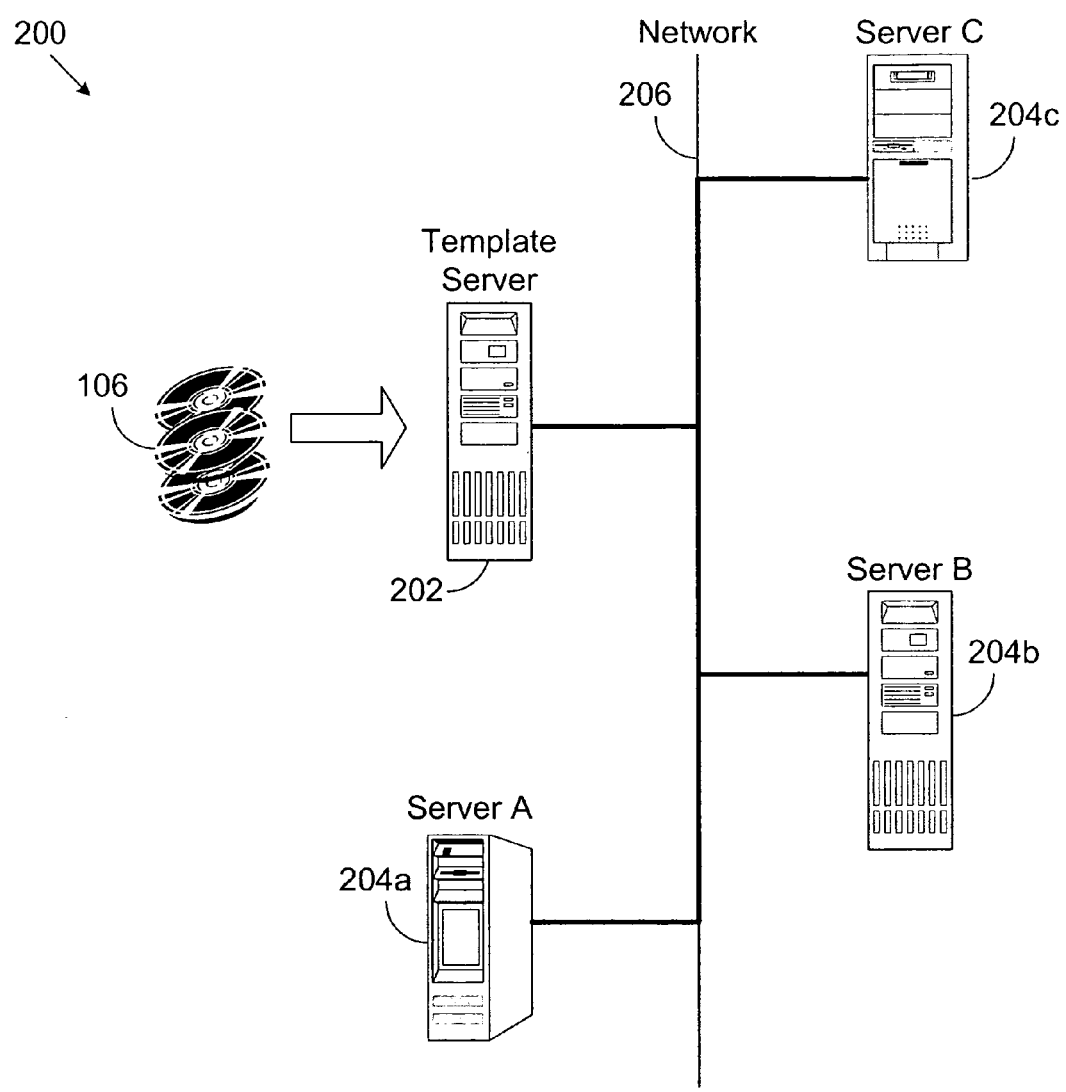
FIG. 2 illustrates a system for installing multiple instances of a software application.

FIG. 2 illustrates a system 200 that may be used for providing multiple installations of a software application. The system 200 includes a technical support computing system 202 (also referred to herein as a template server) connected to a number of user computing systems 204a, 204b, and 204c over a network 206. A software application is installed from the portable media 106 onto the template server 202 (e.g., by technical support or other appropriate personnel) instead of one or more of the computing systems 204a, 204b, or 204c. The installed software application is subsequently used to create an installation template from which further installations of the software application may be performed. The installation template may then be transferred to each user computing system 204a, 204b, or 204c as needed over the network 206 to install the software application. Such an arrangement allows additional installations of the software application to be created on the user computing systems 204a, 204b, and 204c, perhaps without resorting to the portable media 106.

Figure 3:
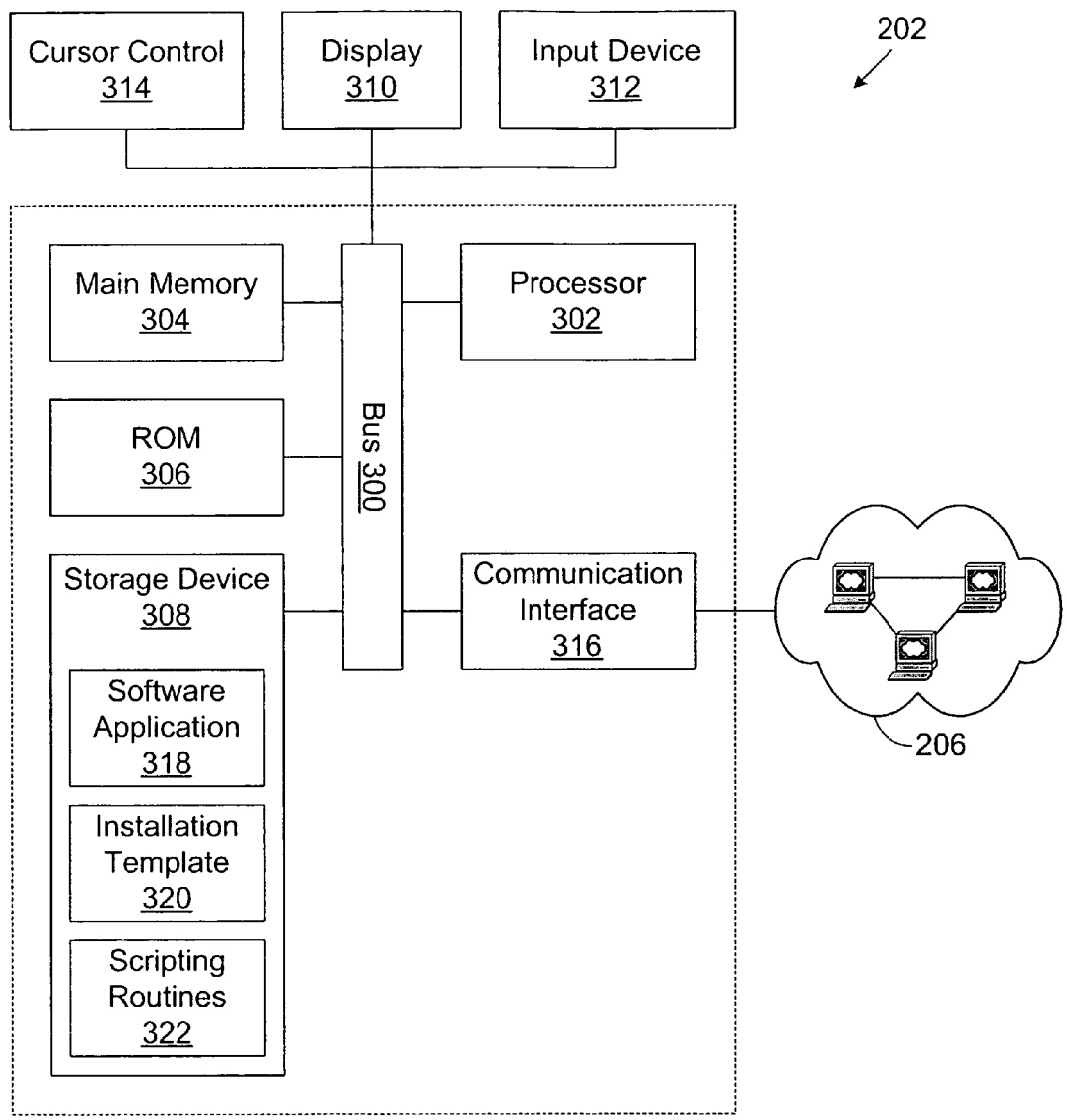
FIG. 3 illustrates a computing system for installing multiple instances of a software application.

FIG. 3 illustrates the template server 202 in more detail. In the implementation shown, the template server 202 includes a bus 300 or other communication mechanism for communicating information and a processor 302 coupled with the bus 300 for processing information. The template server 202 also includes a main memory 304, such as a random access memory (RAM) or other dynamic storage device, coupled to the bus 300 for storing computer-readable instructions to be executed by the processor 302. The main memory 304 also may be used for storing temporary variables or other intermediate information during execution of the instructions to be executed by the processor 302. The template server 202 further includes a read-only memory (ROM) 306 or other static storage device coupled to the bus 300 for storing static information and instructions for the processor 302. A computer-readable storage device 308, such as a magnetic disk or optical disk, is coupled to the bus 300 for storing information and instructions for the processor 302.

The template server 202 may be coupled via the bus 300 to a display 310, such as a cathode ray tube (CRT), for displaying information to a user. An input device 312, including, for example, alphanumeric and other keys, is coupled to the bus 300 for communicating information and command selections to the processor 302. Another type of user input device is a cursor control 314, such as a mouse, a trackball, or cursor-direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer-readable instructions" as used above refers to any instructions that may be performed by the processor 302 and/or other components. Similarly, the term "computer-readable medium" refers to any storage medium that may be used to store the computer-readable instructions. Such a medium may take many forms, including, but not limited to, non-volatile media, volatile media, and transmission media. Non-volatile media include, for example, optical or magnetic disks, such as the storage device 308. Volatile media include dynamic memory, such as main memory 304. Transmission media include coaxial cables, copper wire and fiber optics, including wires of the bus 300. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EPROM, any other memory chip or cartridge, a carrier wave, or any other medium from which a computer can read.

Various forms of the computer-readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the template server 202 can receive the data on the telephone line and use an infrared transmitter to convert the data to an infrared signal. An infrared detector coupled to the bus 300 can receive the data carried in the infrared signal and place the data on the bus 300. The bus 300 carries the data to the main memory 304, from which the processor 302 retrieves and executes the instructions. The instructions received by the main memory 304 may optionally be stored on the storage device 308 either before or after execution by the processor 302.

The template server 202 also may include a communication interface 316 coupled to the bus 300. The communication interface 316 provides a two-way data communication coupling between the template server 202 and the network 206. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

Figure 1:
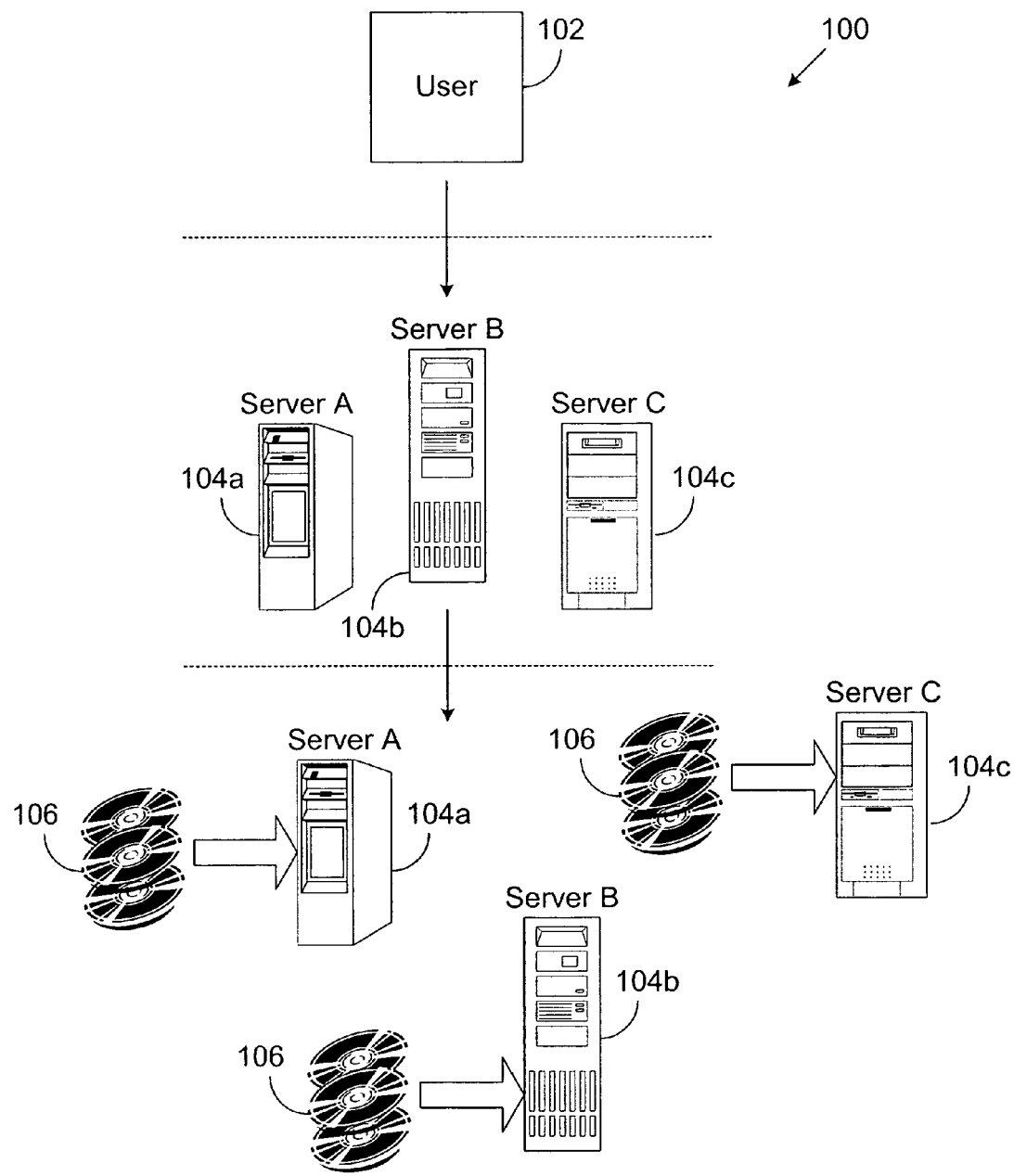
FIG. 1, previously described, illustrates a system for installing multiple instances of a software application according to the prior art.

In one embodiment, a software application 318 is installed on the template server 202, for example, on the storage device 308. The installed software application 318 may then be used to create an installation template 320 from which subsequent installations of the software application 318 may be made. The installation template 320 may thereafter be transferred to each user computing system 204a, 204b, or 204c as needed over the network 206 to install the software application 318. Such an arrangement allows additional installations of the software application 318 to be created on the user computing systems 204a, 204b, and 204c, perhaps without resorting to the portable media 106 (see FIG. 1).

The installed software application 318 is preferably a correct or "golden" installation, meaning that it has been tested and observed to work properly and that all needed patches, fixes, modifications, and customizations have been applied. The use of a "golden" installation ensures that the installation template 320 is correct and that installations of the software application 318 based on the installation template 320 are also correct. To this end, the installation of the software application 318 is preferably performed manually from original portable media 106. Although this task is tedious and time-consuming, it need only be performed correctly once to create the installation template 320. It is also possible to install the software application 318 from, for example, a set of installation files stored on an application server (not expressly shown). If necessary, a trial-and-error approach may be used and the installation repeated until the software application 318 is determined to be correctly installed, (i.e., a "golden" installation).

In some cases, the installation of the software application 318 may produce one or more custom files and/or directories that are specific to the host computing system (i.e., the template server 202). The term "directories" as used herein refers to all types of directories, including main directories and sub-directories. Certain enterprise integration software applications, for example, WebSphere™ from International Business Machine (IBM) Corp., create directories that contain the name of the host computing system in the directories (e.g., "/WebSphere/AppServer/ . . . /ServerA/ . . . "). One or more files for these software applications, including the configuration files, may also contain references to the host computing system. An example of a WebSphere™ directory listing taken using a standard "dir" command is shown in Example 1, where some of the directories have been truncated for economy of the description.

/opt/WebSphere51/DeploymentManager/temp/testopslasjt-Manager
/opt/WebSphere51/DeploymentManager/logs/preload
/opt/WebSphere51/DeploymentManager/installedApps/testopslasjtNetwork
/opt/WebSphere51/DeploymentManager/config/temp/cells/testopslasjtNetwork/nodes/_
/opt/WebSphere51/DeploymentManager/config/temp/cells/testopslasjtNetwork
/opt/WebSphere51/DeploymentManager/config/cells/testopslasjtNetwork/nodes/testopslasjt_
/opt/WebSphere51/DeploymentManager/config/cells/testopslasjtNetwork/opt/WebSphere51/_
/opt/WebSphere51/DeploymentManager/bin/wsinstance/configdefaults/cells/testopslasjt_
/opt/WebSphere51/AppServer/logs/preload
/opt/WebSphere51/AppServer/installedApps/
/opt/WebSphere51/AppServer/config/temp/cells/testopsllsjtNetwork/nodes/testopslasjt
/opt/WebSphere51/AppServer/config/cells/testopsllsjtNetwork/nodes/testopslasjt
/opt/WebSphere51/AppServer/config/backup/base/cells/testopslasjt/nodes/testopslasjt
/opt/WebSphere51/AppServer/config/backup/base/cells/testopslasjt
/opt/WebSphere51/AppServer/bin/wsinstance/configdefaults/cells/testopslasjt/nodes/_
/opt/WebSphere51/AppServer/bin/wsinstance/configdefaults/cells/testopslasjt Example 1

As can be seen from the above example, a number of directories have names that contain a reference to a specific computing system, namely, "testopslasjt." Therefore, for software applications such as WebSphere™, the installed software application 318 must be generalized before the installation template 320 is crea2erjted. This means that references to a specific computing system (e.g., the template server 202) may be temporarily replaced with a generic reference (e.g., "RICK") or variable (e.g., "X") before creating the installation template 320. The generic reference or variable may then be replaced with the name of one of the user computing systems 204a, 204b, or 204c (e.g., Server A, Server B, Server C, etc.) when the installation template 320 is used to install the software application 318 on that user computing system.

In one embodiment, the template server 202 further includes one or more scripting routines 322 stored, for example, on the storage device 308, that are designed to remove specific references to the host computing system. The scripting routines 322 may reside on the template server 202 as shown in this example, or they may reside on some other computing system, then executed on the template server 202 over the network 206. When executed, the scripting routines 322 may recursively search through the directory names of the installed software application 318 looking for any computing system-specific directory names. The scripting routines 322 also search the content of all files for computing system-specific references in the files. The scripting routines 322 thereafter search for the found references, if any, and replace them with a temporary generic reference or variable.

An example of a PERL language scripting routine 322 for compressing the installed files of the software application 318 and for searching and replacing computing system-specific references in the files and directories of the software application 318 in a UNIX-based operating system is shown in Example 2 below. The various commands and statements used in such a scripting routine are believed to be well-understood by those having ordinary skill in the art and will therefore not be described in detail here. Other scripting routines for other operating systems (e.g., Solaris, Linux, Windows, DOS, etc.) running on the template server 202 may also be used without departing from the scope of the invention. Although the compression and file name and directory name searches have been combined in Example 2, it is certainly possible to create separate scripting routines 322 for the compression and the file name and directory name searches without departing from the scope of the invention. When searching and replacing directory names, the scripting routines 322 may proceed through the directory structure in reverse order (i.e., deepest sub-directories first). Otherwise, one or more child directories may not be accessible once the parent directory names have been changed.

```perl
#!/usr/bin/perl
##############################################
This script creates the tar ball install    ###
template and replaces all of the hostname   ###
entries and replaces them with the variable ###
RICK                          ###
(directories and files)              ###
##############################################
use File::Copy;
my $OS = $^O;
chomp($OS);
print "OS = $OS\n";
my $HOST = `hostname`;
chomp($HOST);
print "Host = $HOST\n";
my $appFile = '/tmp/FILES.txt';
if( -e $appFile  ){  `rm $appFile`;  }
my $dirFile = '/tmp/DIRS.txt';
if( -e $dirFile  ){  `rm $dirFile`;  }
my $fileCounter=0;
my $dirCounter=0;
my $Variable = "RICK";
        #------- Obtaining List of Files to Modify -------------------#
        my @files = `find /opt/WebSphere51/ -type f -exec grep -q \"$HOST\"  { } \\\;  -print > $appFile 2>/dev/null`;
        #------- Obtaining List of Directories to Modify -----------#
        my @dirs = `find /opt/WebSphere51/ -type d -name \"$HOST*\"  > $dirFile 2>/dev/null`;
sleep(5);
#-----------------------------------------------------------#
#---  Changing files: hostname to RICK        -------#
#-----------------------------------------------------------#
open(APPFILE,  "$appFile");
@files=<APPFILE>;
close(APPFILE);
foreach $item (  @files  )  {
       chomp($item);
       print "File:   \t $item\n";
       $itemBackup = $item .   ".BAK";
       print "\t\tCopying $item to $itemBackup . . . \n";
       move($item, $itemBackup) or die "Copy failed for $item: $!";
       print "\t\tReplacing $HOST with $Variable . . . \n";
       my $replace = `sed -e 's/$HOST/$Variable/g' $itemBackup >> $item`;
       $fileCounter++;
}
print "NUMBER OF FILES CHANGED: $fileCounter\n";
#-----------------------------------------------------------#
#--- Changing directories: hostname to RICK      --#
#-----------------------------------------------------------#
sub backwards {$b cmp $a};
open(DIRFILE, "$dirFile");
@dirs=<DIRFILE>;
close(DIRFILE);
my @SortedDirs = sort backwards(@dirs);
print "SORTED ARRAY:   \n@SortedDirs\n\n";
foreach $item ( @SortedDirs )  {
         chomp($item);
         if( $item =~ /$HOST/i       ) {
            if( -d $item ) {
                print "\n ........New Entry................\n";
                print "Directory: \t $item\n";
                my $orig = $item;
                $length = length($item);
                $sub = rindex($item, $HOST);
                $original = substr($item,$sub, $length);
                print "ORIGINAL = $original\n";
                (my $Var = $original) =~ s/$HOST/$Variable/;
                print "Var = $Var    \n\n";
                $substring = substr($item, 0, $sub);
                print "SubString: \t$substring\n";
                $substring .= $Var;
                print "Final Substring: ..... $substring\n";
                my $new = $substring;
                print "New Directory: $new\n";
                print "Moving $orig to $new ..... \n";
                `mv $orig $new`;
                $dirCounter++;
            }
         }
}
```

-continued

```
print "NUMBER OF DIRECTORIES CHANGED: $dirCounter\n";
print "Removing all backpFiles made during this process ..... \n\n";
my $BAK = 'find /opt/WebSphere51/ -type f -name "*.BAK"  |  xargs rm';
print "Process in complete ...... Installation template is ready to be tared up
.... \n\n";
#----------------------------------------------------------#
#---- Removing /wstemp & /config/temp dirs ------#
#----------------------------------------------------------#
```

Example 2

After the software application 318 has been generalized, it may be used to create the installation template 320. To create the installation template 320, an archive or backup is made of the installed files of the generalized software application 318. The archive or backup may be compressed, or it may simply be backed up without any compression. The compression may be performed using any suitable compression format (e.g., .ZIP, .TAR, .RAR, etc.), provided that the directory structure for the compressed files is maintained.

In some cases, the installation template 320 may include more than one archive or backup file. For example, the archive or backup files may be organized according to their functions in the software application 318 or some other logical grouping, such as application server files and directories in one installation template file, deployment manager files and directories in another installation template file, and so forth. Note that the installed files of the software application 318 are used for the installation template 320 and perhaps not everything else on the computing system 202 (i.e., the installation template 320 is not an image of the hard drive of the computing system 202).

After the installation template 320 is created, it may be uploaded to any user computing system 204a, 204b, or 204c requiring an instance of the software application 318. The upload may be conducted by a direct file transfer from the template server 202 to a user computing system 204a, 204b, or 204c, or may be conducted over the network 206. The latter case allows any user computing system 204a, 204b, or 204c connected to the network 206 to receive a copy of the installation template 320 regardless of the physical location of the template server 202. Such an arrangement may result in a much more efficient and convenient installation procedure than having to install the software application 318 manually on each computing system from the portable media 106.

Once uploaded, the installation template 320 may be decompressed, unpacked, expanded, or otherwise processed to retrieve the files and directories of the software application 318 onto the new user computing system 204a, 204b, or 204c. The generic reference or variable may then be replaced with the name of the new user computing system. In some embodiments, the scripting routines 322 mentioned earlier may be used to perform the decompression/unpacking of the installation template 320 and insert the name of the new user computing system 204a, 204b, or 204c. An example of a PERL language scripting routine 322 that may be used to decompress/unpack the installation template 320 and insert the name of the new user computing system 204a, 204b, or 204c in a UNIX-based operating system is shown in Example 3 below. Other scripting routines may be used for other operating systems (e.g., Solaris, Linux, Windows, DOS, etc.) without departing from principles of the invention.

```
#!/usr/bin/perl
######################################  ###
This script transforms the tar ball install      ###
template and replaces all of the "RICK"          ###
entries and replaces them with the hostname      ###
of the node .....                         ###
(directories and files)               ###
######################################  ###
use File::Copy;
my $OS = $^O;
chomp($OS);
print "OS = $OS\n";
my $HOST = 'hostname';
chomp($HOST);
print "Host = $HOST\n";
my $appFile = '/tmp/FILES2.txt';
if(  -e $appFile  ){  'rm $appFile';  }
my $dirFile = '/tmp/DIRS2.txt';
if(  -e $dirFile  ){  'rm $dirFile';  }
my $fileCounter=0;
my $dirCounter=0;
my $Variable = "RICK";
my $date = 'date';
chomp($date);
print "$date\n";
        #------- Obtaining List of Files to Modify -------------------#
            my @files = 'find /opt/WebSphere51/ -type f -exec grep -q \"$Variable\"  { } \\\;  -
print > $appFile 2>/dev/null';
            #------- Obtaining List of Directories to Modify -----------#
            my @dirs = 'find /opt/WebSphere51/ -type d -name \"$Variable*\"  > $dirFile
2>/dev/null';
sleep(5);
```

-continued

```
#-------------------------------------------------------------#
#---   Changing files: hostname to RICK        ------#
#-------------------------------------------------------------#
open(APPFILE,   "$appFile");
@files=<APPFILE>;
close(APPFILE);
foreach $item (   @files   )   {
        chomp($item);
        print "File:   \t $item\n";
        if(-f $item) {
            $itemBackup = $item .   ".BAK";
            print "\t\tCopying $item to $itemBackup . . . \n";
            move($item, $itemBackup) or die "Copy failed for $item: $!";
            print "\t\tReplacing $Variable with $HOST . . . \n";
            my $replace = 'sed -e 's/$Variable/$HOST/g' $itemBackup >> $item';
            $fileCounter++;
            unlink($itemBackup);
        }
}
print "NUMBER OF FILES CHANGED: $fileCounter\n";
#-------------------------------------------------------------#
#---     Changing directories: hostname to RICK    --#
#-------------------------------------------------------------#
sub backwards {$b cmp $a};
open(DIRFILE, "$dirFile");
@dirs=<DIRFILE>;
close(DIRFILE);
my @SortedDirs = sort backwards(@dirs);
print "SORTED ARRAY:     \n@SortedDirs\n\n";
foreach $item1 ( @SortedDirs )   {
        chomp($item1);
        if( $item1 =~ /$Variable/i    ) {
            if( -d $item1 ) {
                print "\n ........New Entry.................\n";
                print "Directory: \t $item1\n";
                my $orig = $item1;
                 $length = length($item1);
                 $sub = rindex($item1, $Variable);
                $original = substr($item1,$sub, $length);
                print "ORIGINAL = $original\n";
                (my $Var = $original) =~ s/$Variable/$HOST/;
                print "Var = $Var    \n\n";
                 $substring = substr($item1, 0, $sub);
                print "SubString: \t$substring\n";
                 $substring .= $Var;
                print "Final Substring: ..... $substring\n";
                my $new = $substring;
                print "New Directory: $new\n";
                print "Moving $orig to $new ..... \n";
                'mv $orig $new';
                $dirCounter++;
            }
        }
}
print "\n\nNUMBER OF DIRECTORIES CHANGED: $dirCounter\n";
print "$date\n";
print "\n +++++ Removing Temp Files ......+++++++\n";
my $tempFiles = 'rm /tmp/FILES*';
my $tempDirs = 'rm /tmp/DIRS*';
print "\n\n ++++++++++++++++++++++++++++++++++++++++++++++++++++++++++++++\n";
print "   ++++++++++++++++ PLEASE LOG OUT AS ROOT NOW ++++++++++++++++\n";
print "   ++++++++++++++++++++++++++++++++++++++++++++++++++++++++++++\n\n";
#-------------------------------------------------------#
#---- Removing /wstemp & /config/temp dirs ------#
#-------------------------------------------------------#
```

Example 3

Thus far, the discussion has centered around creation of the installation template 320 on the template server 202. From there, the template server 202 may be uploaded to a selected computing system and decompressed/unpacked to complete installation of the software application 318. A technical support person usually performs the various tasks described (e.g., uploading, decompressing/unpacking, inserting computing system-specific references, etc.). In some embodiments, however, the technical support person may automate the various tasks by providing the installation template 320 to an installation tool along with the required scripting routines 322. The installation tool thereafter performs the uploading, decompressing/unpacking, insertion of computing system-specific references, and other related tasks as needed (e.g., in real time) or according to some predetermined schedule set by the technical support person.

Figure 4:
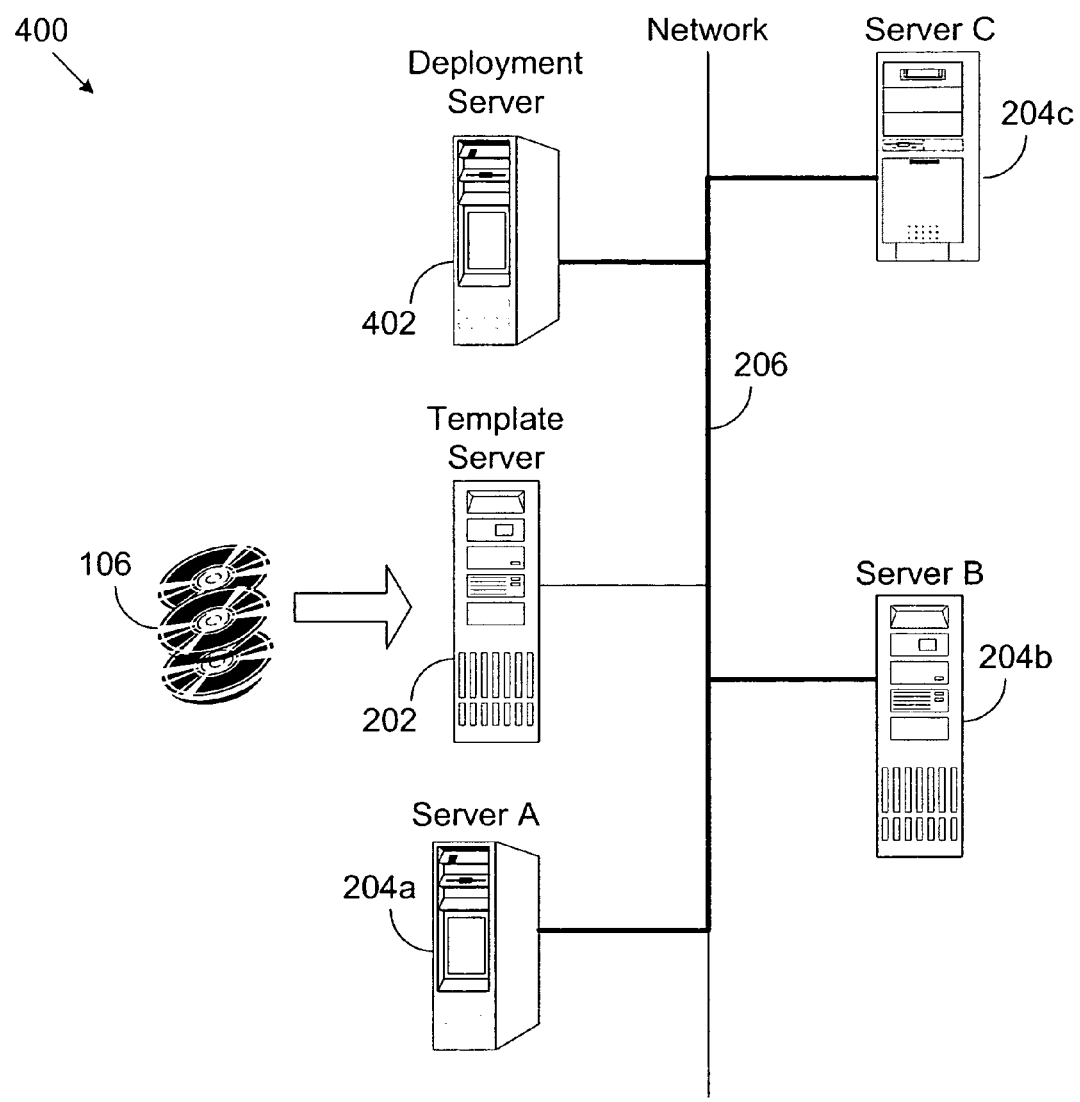
FIG. 4 illustrates another system for installing multiple instances of a software application.

FIG. 4 illustrates a system 400 in which an installation tool may be used for automatically providing multiple installations of a software application. The system 400 is similar to the system 200 of FIG. 2 except that a deployment server 402 has been connected to the network 206. The deployment server 402 is likewise similar to the template server 202 except that the computer-readable storage device of the deployment server 402 contains, among other things, an installation tool. Once the installation template 320 has been created, the technical support person may deposit or otherwise transfer the installation template 320, along with any required scripting routines 322, to the deployment server 402. The installation tool on the deployment server 402 thereafter performs the various installation-related tasks either as needed (e.g., in real time) or according to some predetermined schedule set by the technical support person.

Figure 5:
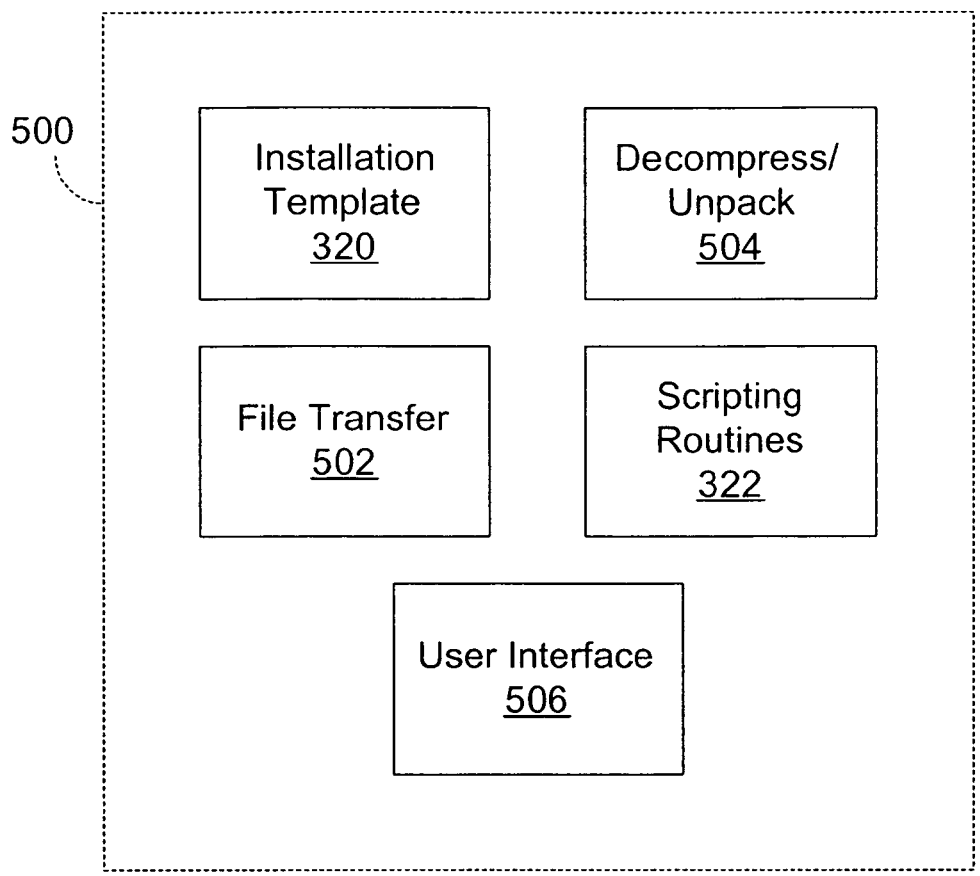
FIG. 5 illustrates an installation tool for installing multiple instances of a software application.

FIG. 5 illustrates the installation tool of the deployment server 402 in more detail. As can be seen, an installation tool 500 includes or has access to a number of components needed for installing multiple instances of the software application 318. For example, the installation tool 500 includes or has access to the installation template 320, a file transfer program 502 for uploading the installation template 320 to a desired user computing system 204a, 204b, or 204c, a decompression/unpacking program 504 for decompressing/unpacking the installation template 320, and one or more scripting routines 322 for removing generic references and inserting computing system-specific references into the software application 318. Other components that may be present include a user interface 506 for allowing the technical support person to interact with the installation tool 500. An example of such an installation tool is BladeLogic™ available from BladeLogic Corp. of Waltham, Mass.

In operation, the technical support person selects the particular user computing system 204a, 204b, or 204c on which to install the software application 318 through the user interface 506. In some embodiments, the technical support person also specifies when the installation is to take place. The installation tool 500 thereafter automatically performs the installation in the manner described above at the appropriate date and time. The date and time of the installation may be in real time, according to some predetermined schedule, or may occur based on some other condition or criteria. Once the installation is complete, the software application 318 is ready to be used on the new user computing system 204a, 204b, or 204c in significantly less time compared to installation from the portable media 106.

Figure 6:
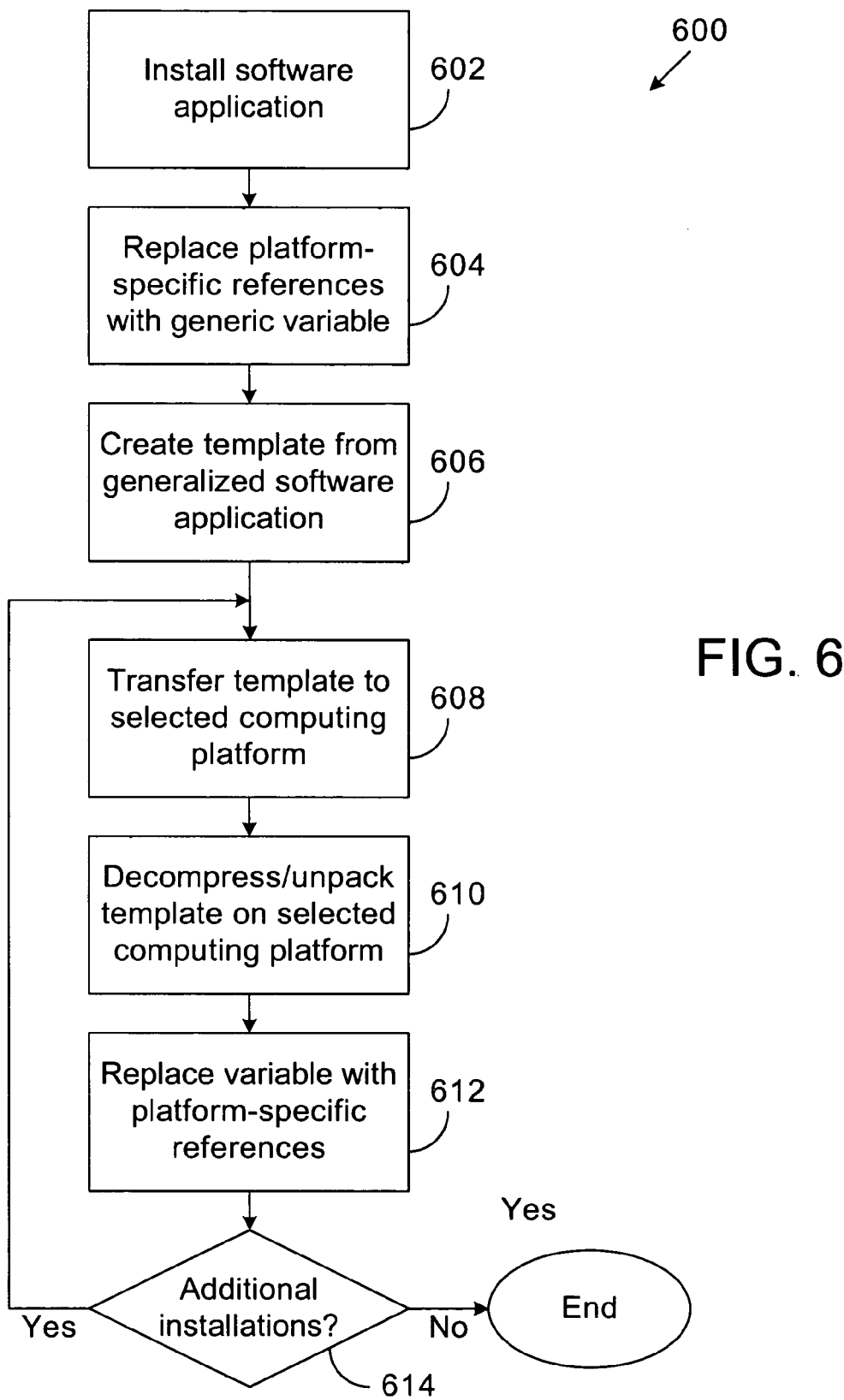
FIG. 6 illustrates a method for installing multiple instances of a software application.

FIG. 6 illustrates a method 600 that may be used to install a software application. The method 600 begins at step 602, where an installation of the software application is performed. This installation may be accomplished using the original portable media in order to ensure a correct installation. Any patches, fixes, modifications, or customizations that may be needed are also applied to the software application at this time. Once a correct installation of the software application has been completed, computing system-specific references in the files, directories, and sub-directories of the installed software application may be replaced with a generic reference or variable at step 604. At step 606, an installation template is created from the files, directories, and sub-directories of the installed software application. In various embodiments, the installation template may be one or more compressed files containing all the files in the software application and their directory structures. In various other embodiments, the installation template is simply a backup or archive of the installed files and directory structure of the software application.

At step 608, the installation template is uploaded to a selected user computing system. The upload may occur over a network or it may be performed from one computing system (e.g., the template server 202) to another computing system. At step 610, the installation template is decompressed/unpacked or otherwise processed to place the files, directories, and subdirectories of the software application on the selected computing system. Generic references or variables may then be replaced with the name of the selected user computing system at step 612 to complete the installation of the software application on the selected computing system. This step may be done either manually by technical support personnel or via an automated installation tool such as BladeLogic™. At step 614, a determination may be made as to whether additional installations of the software application are needed. If the answer is yes, the method 600 returns to step 608 and the installation is repeated for the next computing system. If the answer is no, the method 600 is concluded.

The foregoing embodiments have been described with respect to the installation of a complex software application across an organization's local or private network. However, the embodiments are not limited thereto and may be used to install any software application across any network, including the Internet. In the latter case, the installation template may be stored on a web server and made available through a web site hosted by the web server. The installation template may then be downloaded and used to install a software application as needed. The download may occur free of charge (e.g., freeware, shareware), or as part of an online purchase or other e-commerce transaction (preferably with the appropriate security mechanisms in place). In such embodiments, the provider of the installation template may be a retailer of the software application and the receiver of the installation template may be a purchaser of the software application.

Any compression algorithms, scripting routines (e.g., for handling computing system-specific references), or other software tools may be transferred along with the installation template to the selected computing system. Alternatively, instead of several separate software tools, all required software tools may be bundled together in a single executable program (e.g., a "setup" file) written and compiled in an appropriate programming language (e.g., Java, Flash, Html, Xml, C++, etc.) and subsequently transferred to and executed on the selected computing system. In some embodiments, the executable program containing the software tools may be combined with the installation template as a single file. In any event, the above arrangement allows businesses and consumers alike to benefit from the highly efficient installation system and method discussed herein.

While the embodiments have been described with reference to one or more particular embodiments, those skilled in the art will recognize that many changes may be made thereto. Therefore, each of the foregoing embodiments and obvious variations thereof is contemplated as falling within the spirit and scope of the claimed invention, which is set forth in the following claims.

What is claimed is:

1. A method of distributing a software application over a network with a computing device having a computer processor and computer-readable instructions stored on a non-transitory computer-readable storage medium and executable by the computer processor, the method comprising:

installing a software application on a template server;

creating an installation template of the software application using details of the installation of the software application on the template server, said installation template containing configuration directories and configuration files for said software application, wherein specific reference to the template server is replaced in said configuration directories and configuration files with a generic reference; and using one or more software tools to transfer said installation template to a computing system over a network, retrieve said configuration directories and said configuration files from said installation template, and replace the generic reference in said configuration directories and said configuration files with any computing system-specific references required by said software application with respect to said computing system.

2. The method according to claim 1, wherein said network is the Internet.

3. The method according to claim 2, wherein said installation template is made available through a web site and said computing system is operated by a purchaser of said software application.

4. The method according to claim 2, wherein said one or more software tools used to retrieve and insert are transferred to said computing system along with or as part of said installation template.

5. The method according to claim 1, wherein said network is a private network of an organization.

6. The method according to claim 5, wherein said one or more software tools are controllable by a technical support person of said organization to automatically perform said transfer, said retrieve, and said insert.

7. The method according to claim 1, wherein said one or more software tools are stored on a deployment server for deploying said installation template over said network.

8. A system for distributing a software application over a network, said system comprising at least one subsystem, wherein the subsystem includes a computing device having a computer processor and computer-readable instructions stored on a non-transitory computer-readable storage medium and executable by the computer processor, to:
install a software application on a template server;
create an installation template of the software application using details of the installation of the software applicatoin on the template server, said installation template containing configuration directories and configuration files for said software application, wherein specific reference to the template server is replaced in said configuration directories and configuration files with a generic reference; and
use one or more software tools to transfer said installation template to a computing system over a network, retrieve said configuration directories and said configuration files from said installation template, and replace the generic reference in said configuration directories and said configuration files with any computing system-specific references required by said software application with respect to said computing system.

9. The system according to claim 8, wherein said network is the Internet.

10. The system according to claim 9, wherein said installation template is made available through a web site and said computing system is operated by a purchaser of said software application.

11. The system according to claim 9, wherein said one or more software tools used to retrieve and insert are transferred to said computing system along with or as part of said installation template.

12. The system according to claim 8, wherein said network is a private network of an organization.

13. The system according to claim 12, wherein said one or more software tools are controllable by a technical support person of said organization to automatically perform said transfer, said retrieve, and said insert.

14. The system according to claim 8, wherein said one or more software tools are stored on a deployment server for deploying said installation template over said network.

15. A computing device having a computer processor and computer-readable instructions for distributing a software application over a network stored on a non-transitory computer-readable storage medium and executable by the computer processor, said non-transitory computer-readable instructions comprising instructions for:
installing a software application on a template server;
creating an installation template of the software application using details of the installation of the software application on the template server, said installation template containing configuration directories and configuration files for said software application, wherein specific reference to the template server is replaced in said configuration directories and configuration files with a generic reference; and
using one or more software tools to transfer said installation template to a computing system over a network, retrieve said configuration directories and said configuration files from said installation template, and replace the generic reference in said configuration directories and said configuration files with any computing system-specific references required by said software application with respect to said computing system.

16. The computing device according to claim 15, wherein said network is the Internet.

17. The computing device according to claim 16, wherein said installation template is made available through a web site and said computing system is operated by a purchaser of said software application.

18. The computing device according to claim 16, wherein said one or more software tools used to retrieve and insert are transferred to said computing system along with or as part of said installation template.

19. The computing device according to claim 15, wherein said network is a private network of an organization.

20. The computing device according to claim 19, wherein said one or more software tools are controllable by a technical support person of said organization to automatically perform said transfer, said retrieve, and said insert.

21. The computing device according to claim 15, wherein said one or more software tools are stored on a deployment server for deploying said installation template over said network.

* * * * *